May 19, 1964  M. ROECKNER  3,133,460
ROLLING MILL FOR TUBULAR WORKPIECES
Filed Aug. 6, 1962  9 Sheets-Sheet 3
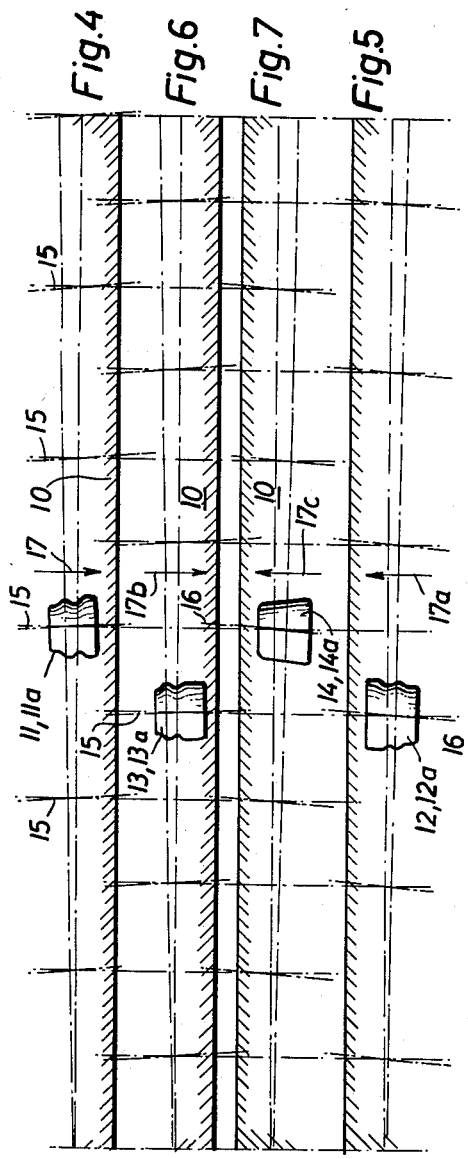
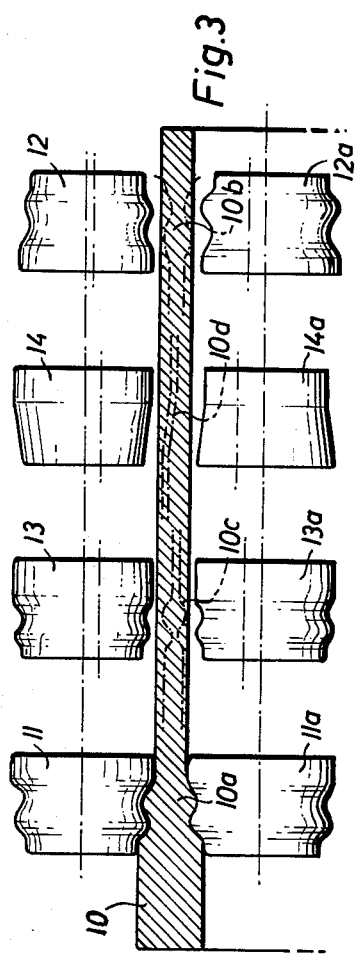
INVENTOR
Martin Roeckner
BY
Michael S. Striker

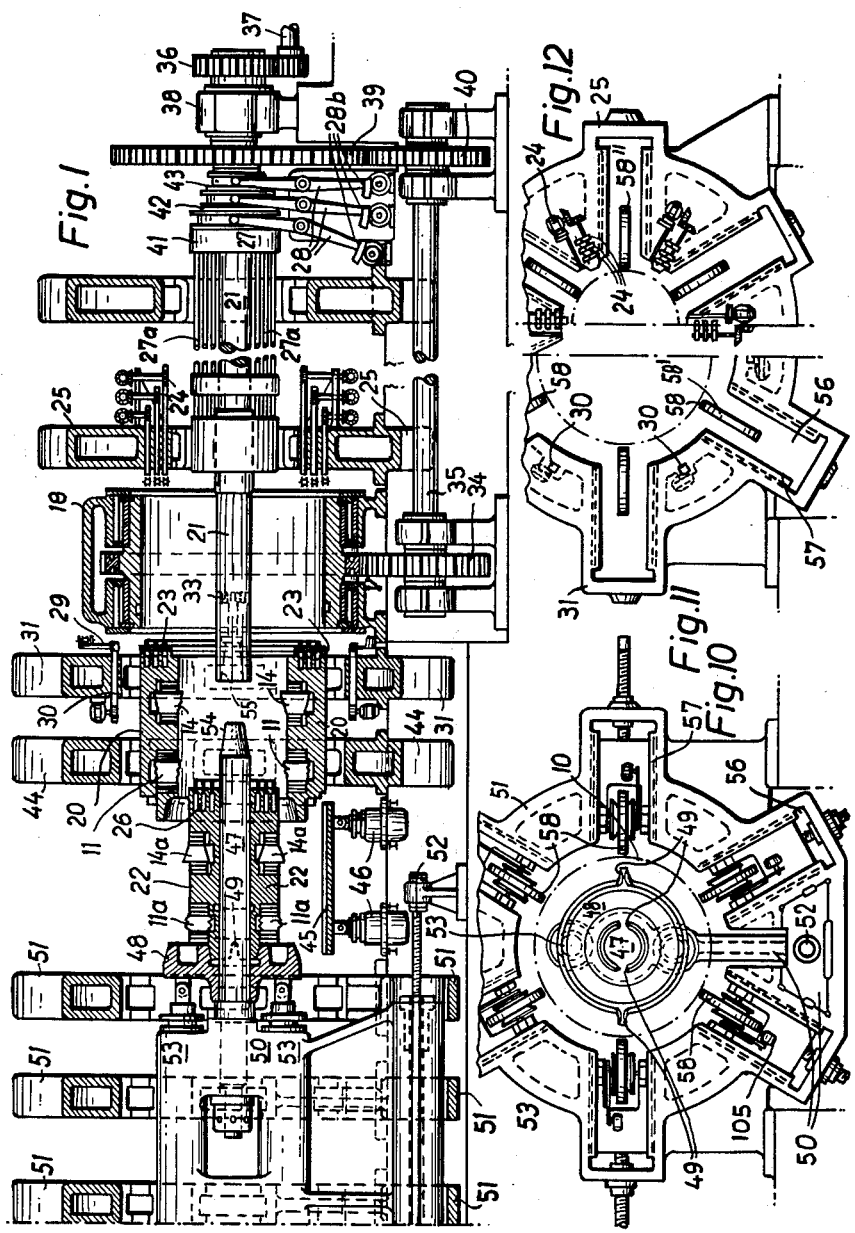

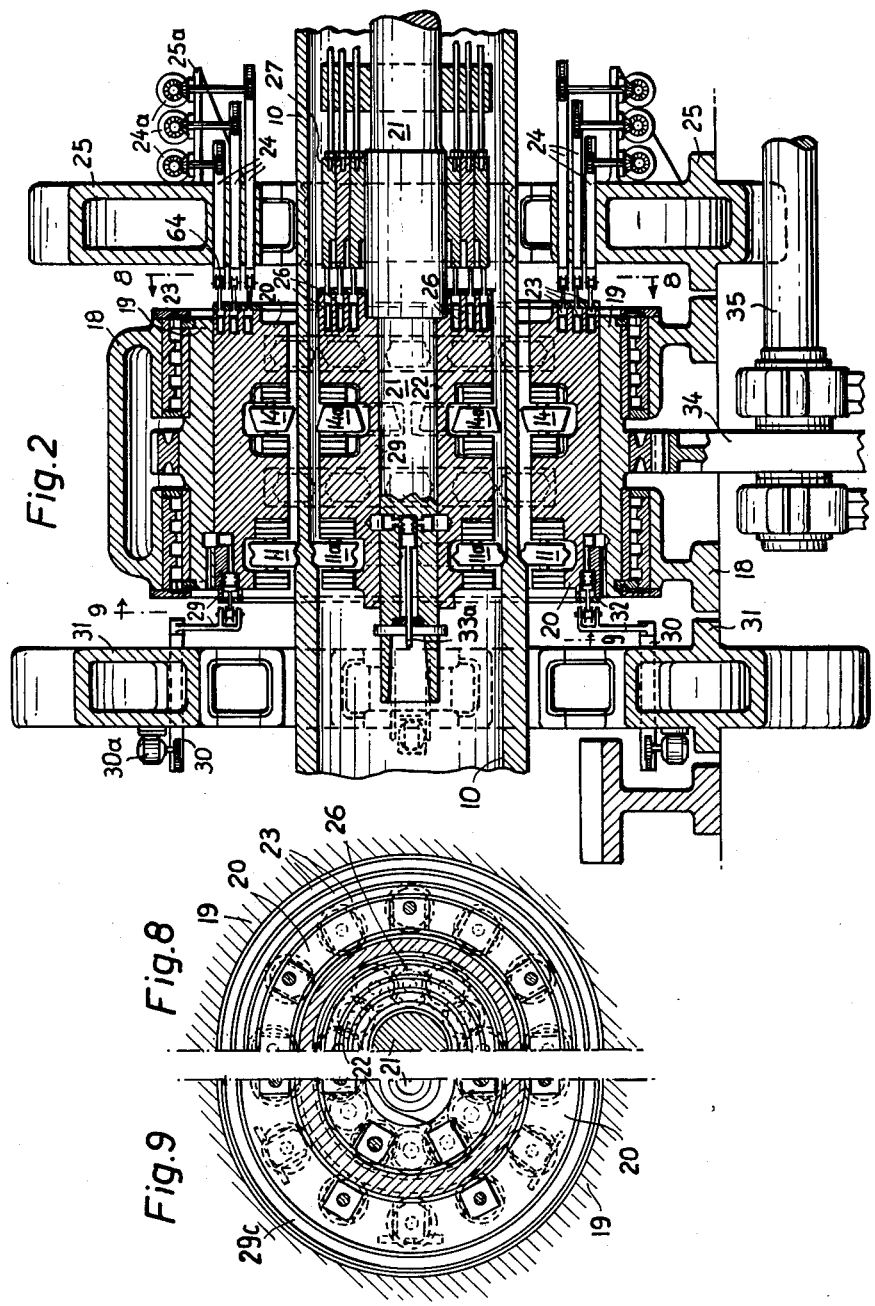

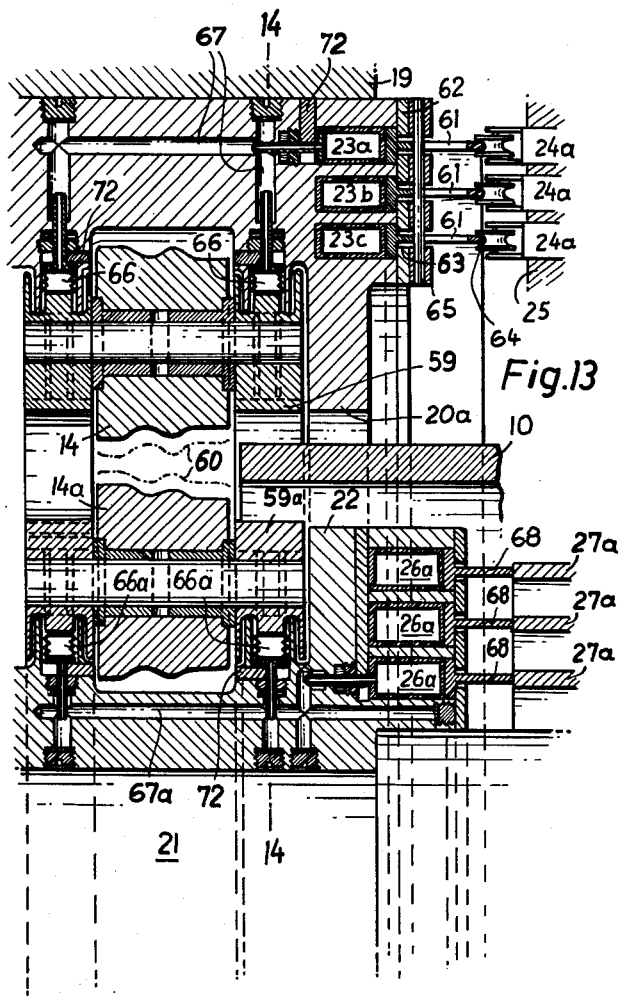

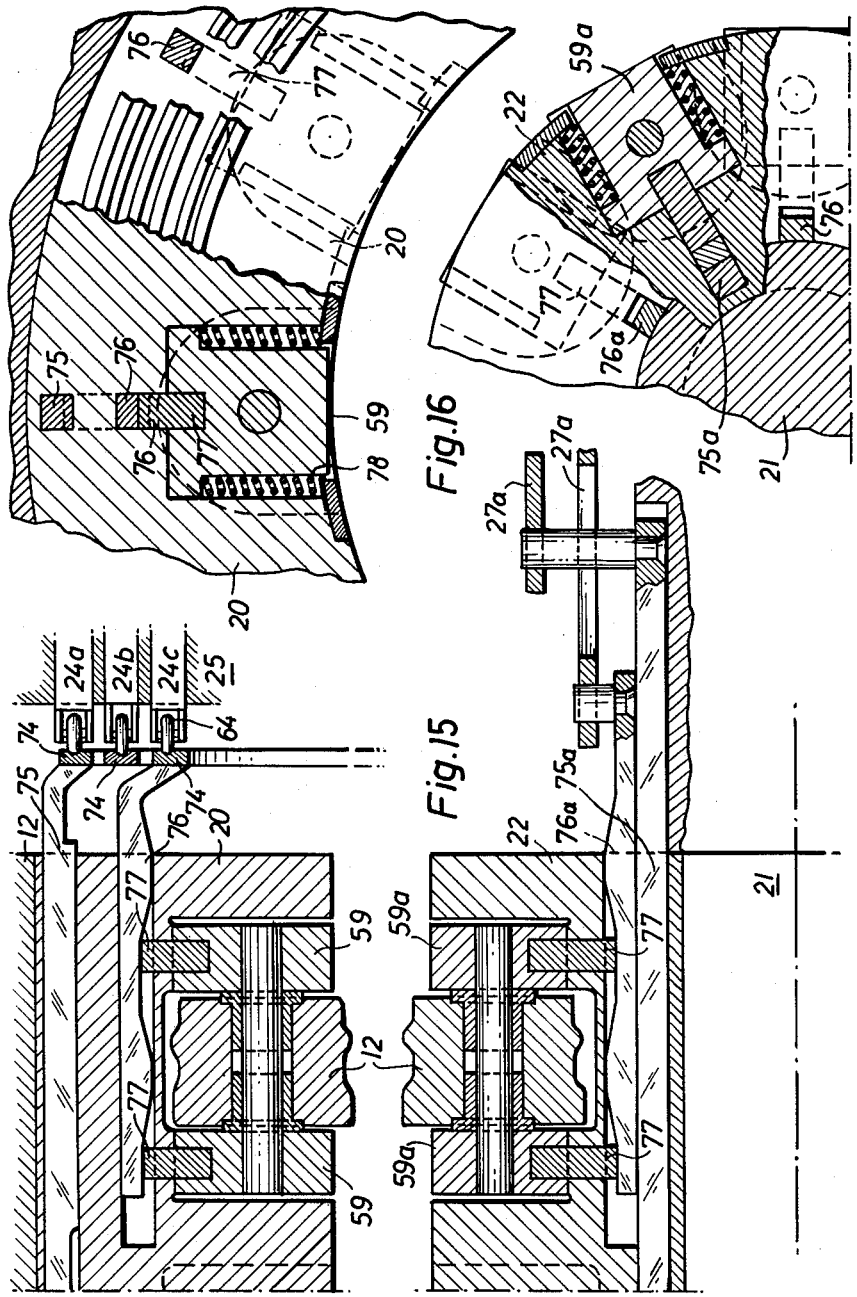

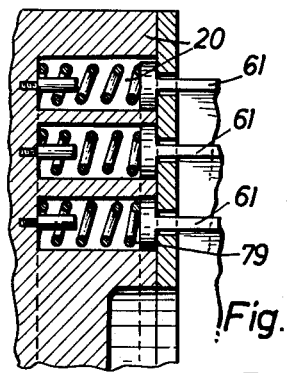
Fig.17
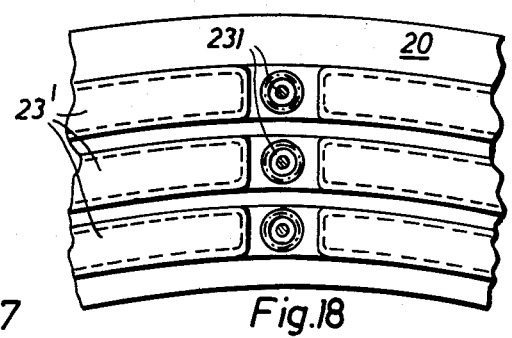
Fig.18
Fig.19
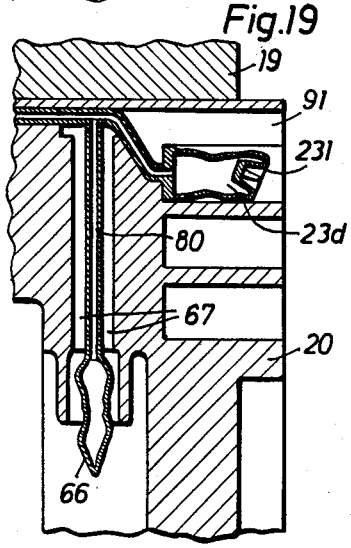
Fig.20
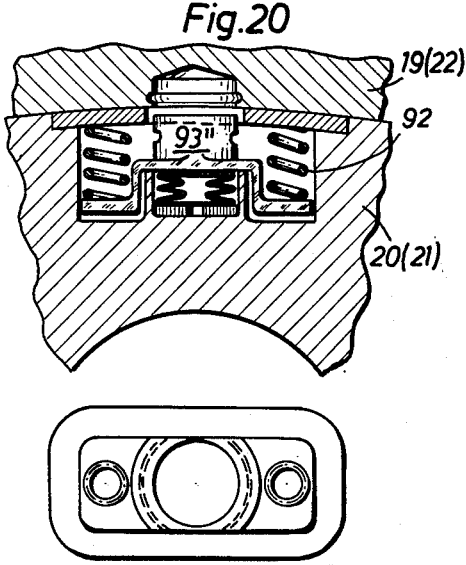
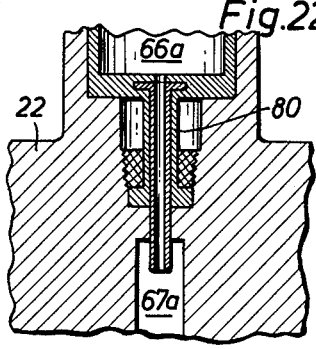
Fig.22
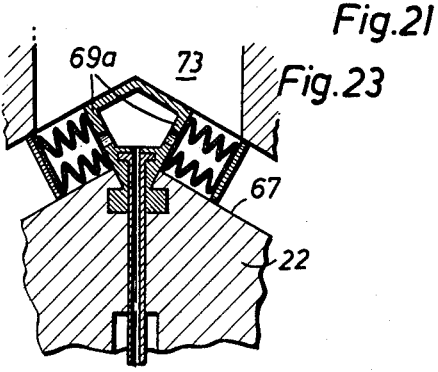
Fig.21 Fig.23

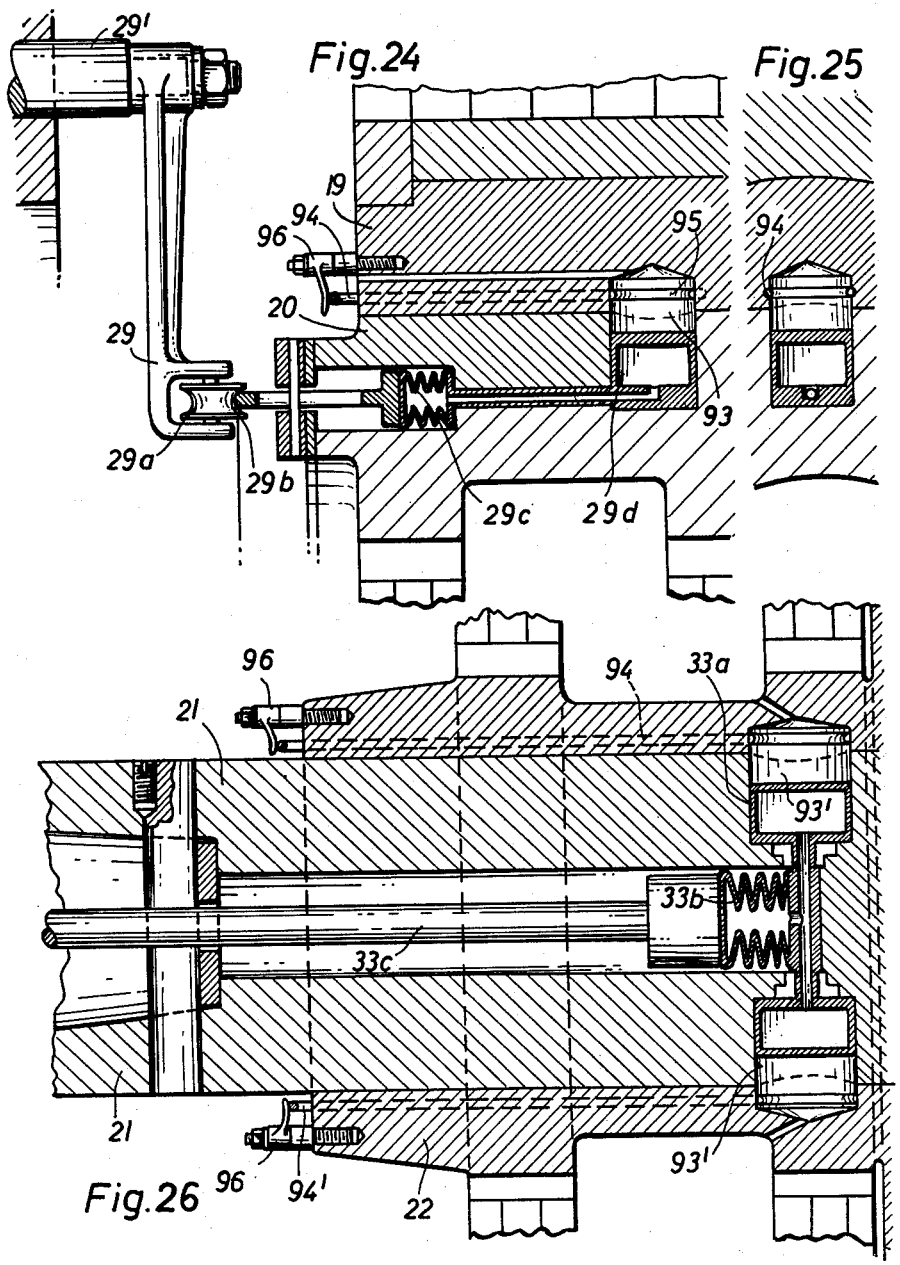

May 19, 1964  M. ROECKNER  3,133,460
ROLLING MILL FOR TUBULAR WORKPIECES
Filed Aug. 6, 1962
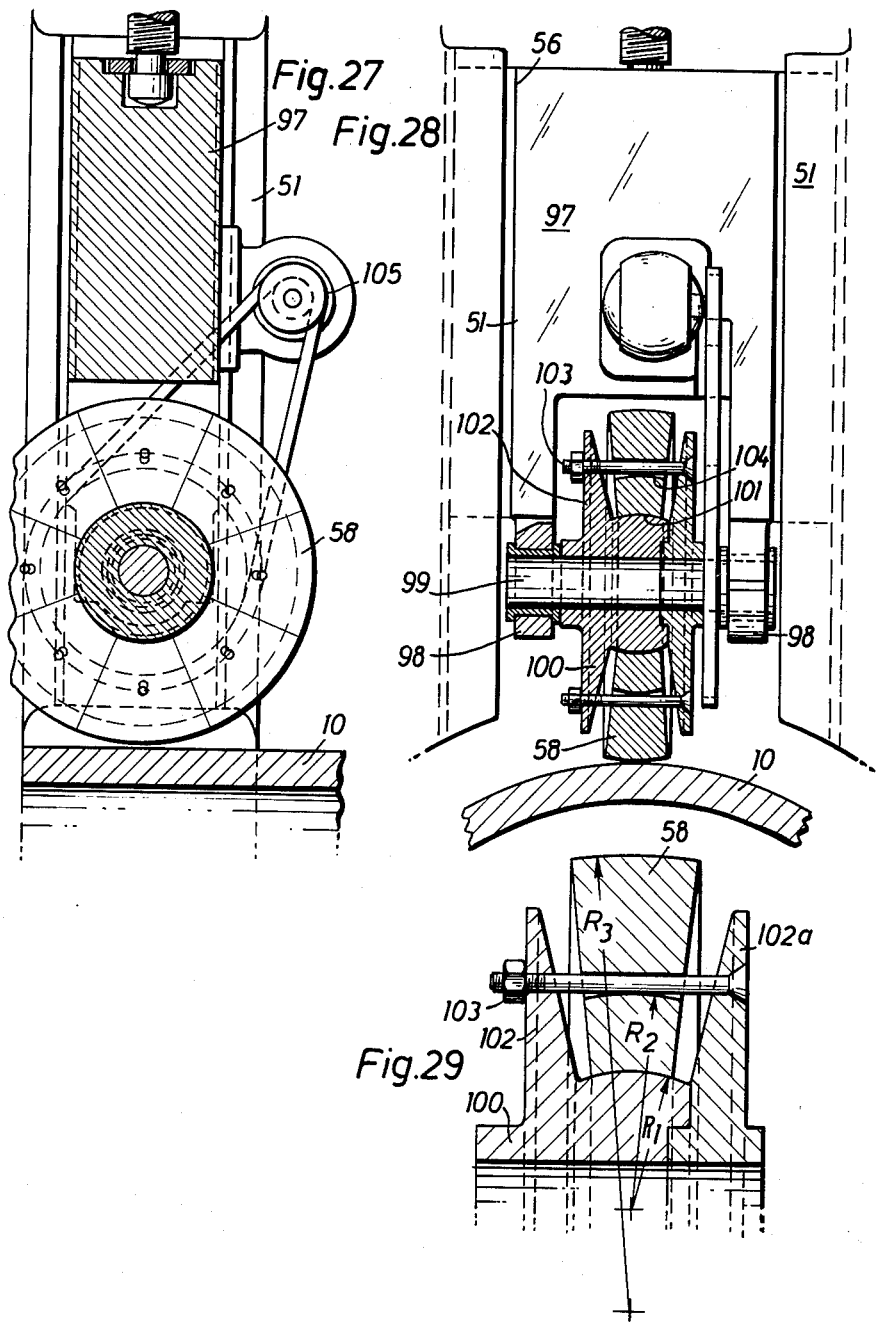

United States Patent Office

3,133,460
Patented May 19, 1964

3,133,460
ROLLING MILL FOR TUBULAR WORKPIECES
Martin Roeckner, Honnef (Rhine), Germany
Filed Aug. 6, 1962, Ser. No. 214,966
20 Claims. (Cl. 80—12)

The present invention relates to a rolling mill for tubular workpieces, and more particularly to a roller mill of the type in which pairs of roller dies move about a workpiece in circumferential direction and have axes inclined to the axis of the workpiece so that the workpiece is transported in axial direction.

Known roller mills of this type have carriers for the outer and inner roller dies, which are first built into a stand spaced from the work place, and are prevented from relative displacement by temporary positioned means. The stand is mounted on rails on which it is moved to the work place. When the stand with the carriers is arranged in the proper position on the work place, the temporary supporting means are removed, and the rolling operation can start. Only a single set of pairs of roller dies is provided in the inner and outer carrier means, so that the workpiece is subjected to a single rolling operation in this position. A second stand with carriers and roller dies is required, and is positioned along a rail means, so that the carriers with a second set of roller dies can be moved to the work place, and mounted in the rotary holding means by which the carriers are rotated.

It is one object of the present invention to improve the prior art arrangements for rolling tubular workpieces, and to provide a rolling mill of this type in which more than one rolling operation can be carried out by a plurality of sets of pairs of roller dies mounted on inner and outer carrier means.

Another object of the present invention is to provide a rolling mill in which the tubular workpiece is moved forward and rearward in axial direction when rolled in two sets of roller dies while the carrier means of the roller dies move in the same sense of rotation.

Another object of the present invention is to provide a rolling mill permitting successive rolling operations to take place without interruption.

Another object of the present invention is to provide a roller mill by which a tubular workpiece is rolled to obtain a desired reduced wall thickness and increased length in a time much shorter than possible in rolling mills of the prior art.

In accordance with the present invention, several sets of roller dies are provided for moving the workpiece successively forwardly and rearwardly, and at least some of the roller dies which perform the second or following rolling operations, are movable to an operative rolling position in which the thickness of the workpiece is reduced to such an extent that the workpiece can pass between the roller dies of the preceding rolling operations without engaging the same.

In accordance with the present invention, the roller dies are moved to the operative rolling position while the carriers thereof remain in place in the rotary holding means, and even during rotation of the carrier means with the holding means.

In accordance with the present invention, a turning movement of the workpiece is prevented, without mounting the workpiece on a heavy carriage. The present invention provides guide or transporting rollers, which when tilted by very slight angular movement of the workpiece, clamp the workpiece and prevent further turning movement of the same.

In a preferred embodiment of the invention, four sets of pairs of outer and inner roller dies are provided, so that the workpiece can be rolled by moving forward, then rearward, then forward again and then rearward again. The pairs of roller dies of each set can be moved to the operative rolling position by operating means which may be actuated during rotation of the carriers with the roller dies.

In a preferred embodiment of the invention, the roller dies are moved between inoperative and operative position by hydraulic motor means. In one embodiment of the invention, the hydraulic motor means are controlled by compressible containers which, when compressed by presser means actuated under control of the operator, effect advance of the roller dies to the operative position.

In accordance with the invention, the transporting and guide rollers are mounted on a support and are angularly spaced about the periphery of the workpiece. During the rolling operations when the workpieces are supported by the roller dies, the transporting and guide rollers serve only as guide rollers, and need not be driven. However, when the workpiece is to be placed in engagement with the first set of roller dies, or when the carriers of the roller dies are to be placed in the driven holding means of the roller mill, then the guide rollers are driven, and serve as transporting rollers. In this manner, separate transporting rollers are not required in the rolling mill of the present invention.

In prior art constructions, the carriers of the roller dies are secured by bolt and nut means in the holding means to rotate with the same. In accordance with the present invention, operator controlled coupling means are provided for coupling the outer carrier with outer holding means, and the inner carrier with inner holding means, so that the connection between the carriers and the holding means can be easily established, and disconnected. In the preferred embodiment of the invention, the coupling means are hydraulically operated, preferably by compressible and expansible containers containing an operating fluid.

A rolling mill according to one embodiment of the invention comprises stationary supporting means, an outer carrier means and an inner carrier means mounted on the supporting means for rotation about the common axis and defining between each other an annular path for a tubular workpiece; drive means for non-rotatably guiding the workpiece along the path in the direction of the axis of the carrier means; guide means for rotating the outer and inner carrier means in one direction, and preferably including outer and inner holding means coupled to the outer and inner carrier means; at least one set of angularly spaced pairs of outer and inner first dies mounted on the outer and inner carrier means projecting into the annular path; at least one set of angularly spaced pairs of outer and inner second dies mounted on the outer and inner carrier means axially spaced from the first die and movable between an inoperative position and an operative position projecting into the path of the workpiece, the first and the second dies being inclined in the opposite direction to the axis of the carrier means; and operating means for moving the second dies between the inoperative and operative position. Actuating means are provided for actuating the operating means, so that the second dies are held in the inoperative position while the workpiece is engaged along a helical line and transported in one axial direction by the first dies during rotation of the carrier means. After treatment of the workpiece by the first dies has been completed, the operating means move the second dies to the operative position whereby the workpiece is moved by the second dies in the opposite axial direction during rotation of the carrier means in the same sense of rotation. This is due to the opposite inclination of the first and second dies to the axis of the carrier means, or more particularly to the opposite inclination of the axes of the first and second dies, which are roller dies mounted on the outer and inner carrier means, respectively.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is an axial sectional view illustrating a roller mill arrangement in accordance with one embodiment of the present invention;

FIG. 2 is a fragmentary axial view illustrating the embodiment of FIG. 1 on a larger scale;

FIG. 3 is a fragmentary schematic axial sectional view illustrating a rolling operation according to the present invention on a larger scale;

FIGS. 4, 5, 6 and 7 are fragmentary schematic developed views illustrating operational positions of roller dies in the rolling mill of FIGS. 1 and 2;

FIG. 8 is a fragmentary cross sectional view taken on the line 8—8 in FIG. 2;

FIG. 9 is a fragmentary cross sectional view taken on line 9—9 in FIG. 2;

FIG. 10 is a fragmentary end view of guide means for guiding a tubular workpiece in axial direction during a rolling operation;

FIG. 11 is a fragmentary end view of a modified guide means;

FIG. 12 is a fragmentary end view of another guide means for a tubular workpiece provided with actuating means for the roller dies of the rolling mill;

FIG. 13 is a fragmentary axial sectional view on an enlarged scale illustrating the operating means and actuating means for moving the roller dies of the rolling mill to an operative position;

FIG. 15 is a fragmentary axial sectional view illustrating a modified embodiment of the operating and actuating means for the roller dies;

FIG. 16 is a fragmentary side view, partly in cross section on line 16—16 in FIG. 15;

FIG. 17 is a fragmentary axial sectional view illustrating a detail of a modification of the arrangement of FIG. 13;

FIG. 18 is a fragmentary side view of the modification shown in FIG. 17;

FIG. 19 is an axial sectional view illustrating a modification of the construction of FIG. 13;

FIG. 20 is a fragmentary cross sectional view illustrating a detail of coupling means;

FIG. 21 is a fragmentary plan view of the construction shown in FIG. 20;

FIG. 22 is a fragmentary sectional view illustrating a detail of the embodiment of FIG. 13;

FIG. 23 is a fragmentary cross sectional view illustrating a detail of the construction of FIG. 14;

FIG. 24 is a fragmentary axial sectional view illustrating on an enlarged scale coupling means provided in the embodiment of FIGS. 1 and 2;

FIG. 25 is a fragmentary cross sectional view illustrating a detail of the construction of FIG. 24;

FIG. 26 is a sectional view illustrating other coupling means used in the embodiment of FIGS. 1 and 2;

FIG. 27 is a fragmentary axial sectional view illustrating a detail of the construction of FIG. 10;

FIG. 28 is a fragmentary cross sectional view illustrating a detail of the construction of FIG. 10 for non-rotatably guiding a tubular workpiece through the rolling mill; and FIG. 29 is a fragmentary sectional view illustrating a detail of FIG. 28 on a larger scale.

Figure 14:
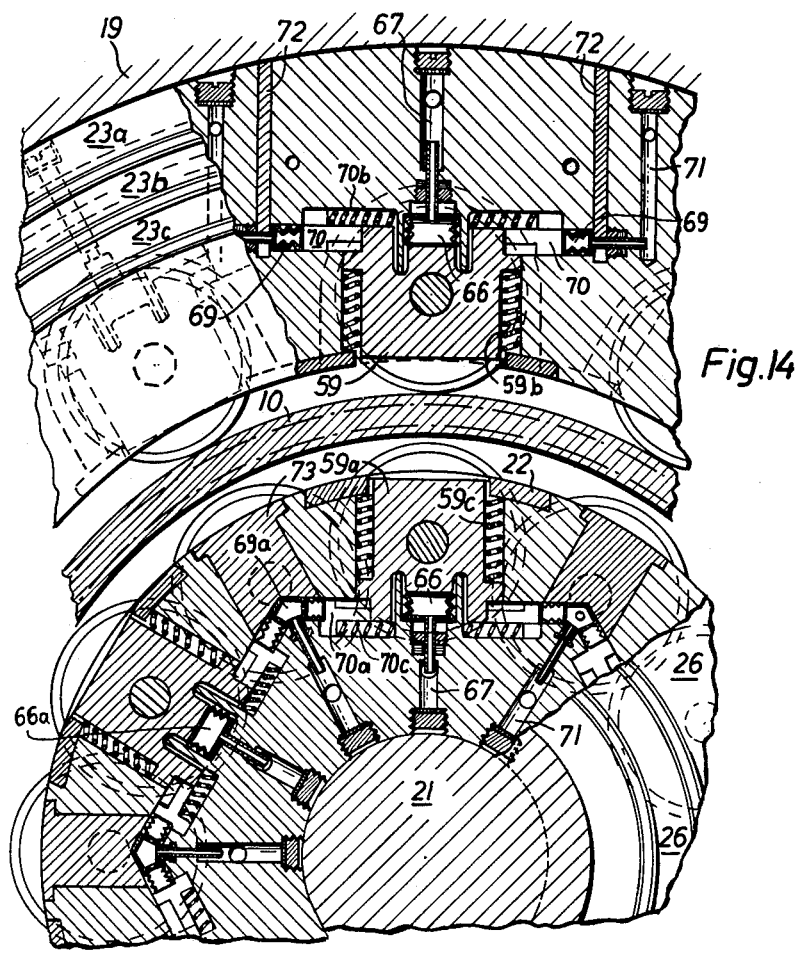
FIG. 14 is a fragmentary cross sectional view taken on line 14—14 in FIG. 13 and illustrating on an enlarged scale the operating means for the roller dies.

Referring now to the drawings, and more particularly to FIGS. 1 and 2, a tube mill according to the present invention includes supporting means comprising a main roller stand 18, and additional supports 25, 31, 44 and 51. An outer annular holding means 19 is rotatably mounted in roller stand 18, and is coupled by coupling means 29 to an annular outer carrier means 20 on which four sets of outer roller dies 11, 12, 13 and 14 are rotatably mounted.

An inner carrier means 22 is secured by coupling means 33 to an inner holding means 21 in the form of a mandrel. Inner roller dies 11a, 12a, 13a and 14a are rotatably mounted on the inner carrier means 22. Four sets of angularly spaced pairs of outer and inner cooperating roller dies 11 and 11a, 12 and 12a, 13 and 13a, 14 and 14a are provided for rolling a tubular workpiece 10 which passes in axial direction through the annular path defined by the outer and inner carrier means 20, 22, and is treated by the outer and inner roller dies during such movement.

The roller dies 11, 11a are mounted to project into the path of the workpiece, and to engage the workpiece 10 when the same enters into the path between the outer and inner carrier means. The other roller dies are mounted on the outer and inner carrier means for radial movement toward and away from each other between an inoperative position retracted from the path of the workpiece, and an operative position projecting into the path and adapted to engage the workpiece. Operating means 23 and 26 are provided for moving the roller dies to the operative positions, and actuating means 24 and 27 are provided for controlling the operating means as will be explained hereinafter in greater detail.

When the carrier means 20 and 22 are coupled to the outer holding means 19 and to the inner holding means 21, they can be rotated about a common axis so that the outer and inner roller dies roll around the outer and inner surfaces of the workpiece 10.

Referring now to FIG. 3, it will be seen that during a first run of the workpiece in axial direction to the right as viewed in FIGS. 1 and 2, only roller dies 11 and 11a will engage the workpiece, and deform the portion 10a of the same so that the wall thickness of the workpiece is reduced, and its axial length extended. As is shown in FIG. 4, the roller axis 15 is inclined to the common axis of rotation of the carrier means 20 and 21, so that rollers 11 roll along a helical line on the workpiece, and transport the same to the right as viewed in the drawing. Only one roller die is shown in each of FIGS. 4 to 7, but it will be understood that each set of roller dies has, for example, six pairs of roller dies angularly spaced about the workpiece. The rollers 11, 11a and 13, 13a have parallel roller axes 15, while the rollers 12, 12a and 14, 14a have axes 16 inclined in an opposite direction to the common axis of rotation of the carrier means 20 and 22.

When the workpiece has been moved in a direction of the arrow 17 in FIG. 4, that is to the right of FIG. 3 by the operation of the roller dies 11, 11a, the roller dies 12, 12a are moved to an advanced position engaging the workpiece as indicated by broken lines. While the carrier means 20, 22 continue to rotate in the same sense of direction, the workpiece is now driven in axial direction of the arrow 17a in FIG. 5 and to the left as viewed in FIG. 3 due to the fact that the axes 16 of roller dies 12, 12a are oppositely inclined to the axes 15, so that the helical line along which roller dies 12, 12a move on the workpiece has an opposite direction, corresponding to left-handed and right-handed thread. The roller dies 12, 12a in the operative position project farther into the path of the workpiece than the roller dies 11, 11a, so that the wall thickness of the tubular workpiece is further reduced, permitting the workpiece to travel between the roller dies 11, 11a wthout engaging the same.

As best seen in FIG. 10, guide rollers 58 roll around axially extending lines of the workpiece during travel of the workpiece in axial direction. As will be described hereinafter in greater detail, the rollers 58 are constructed in such a manner as to prevent turning movements of the workpiece 10, so that the axial movement of the workpiece 10 can be obtained by the inclined roller dies 11 and 12.

When roller dies 12, 12a have moved the workpiece all the way to the left, the roller dies 13, 13a are moved to an operative position in which they project into the path of the workpiece 10 farther than the roller dies 12, 12a. Since the roller axes of roller dies 13, 13a are parallel to the axes of rollers 11, the workpiece is again driven to the right as viewed in FIG. 3, and in the direction of the arrow 17b in FIG. 6, and passes between the roller dies 12, 12a without engaging the same. Thereupon, roller dies 14 and 14a are moved to the operative position in which they are more closely spaced than the roller dies 13, 13a so that the wall thickness of the workpiece is further reduced while the workpiece travels to the left as viewed in FIG. 3 and in the direction of the arrow 17c in FIG. 7 due to the fact that the axes of rollers dies 14, 14a are parallel to the axes of roller dies 12, 12a. The peripheral engaging surfaces of roller dies 14, 14a have an almost conical shape so that the workpiece is finished and has smooth outer and inner surfaces when the rolling operation is completed.

Due to the fact that the wall thickness of the workpiece 10 is reduced by each rolling operation, it is not necessary to retract the roller dies after they have performed an operation on the workpiece.

FIGS. 13 and 14 illustrate hydraulic operating means for the roller dies, only the pair of rollers dies 14, 14a being shown in FIG. 13. The roller dies are shown in a position retracted from the workpiece, but can be moved to a position in which the workpiece is engaged and deformed as indicated by the dash and dot lines 60. Mounting means 59, 59a are mounted in the outer carrier means 20 and in the inner carrier means 22 for movement in radial direction, and include shaft means turnably supporting the roller dies for rotation about axes which are inclined to the common axis of rotation of carrier means 20 and 22. Spring means 95b and 95c engage shoulders of the mounting means 59 and 59a as best seen in FIG. 14 and urge the same to the farther spaced inoperative position. On opposite sides of the roller dies, the mounting means are engaged by flexible expansible bellow means 66, 66a which communicate through conduits 67 and 67a in the outer carrier means 20 and in the inner carrier means 22 with flexible compressible container means 23a, 23b, 23c in the outer carrier means 20, and with flexible compressible container means 26a, 26b, 26c in the inner carrier means 22. The container means are annular, and are located in corresponding annular chambers of the outer and inner carrier means. Annular presser means 61 of T-shaped cross section have annular parts abutting the compressible container means 23a, 23b, 23c, and other annular parts projecting from the carrier means 20 into the region of rollers 64 which are mounted on three corresponding actuating members 24 which are longitudinally shiftable in the support 25. As shown in FIGS. 1 and 2, the ends of the actuating members 24 are rack bars engaged by pinions driven through bevel gears from three corresponding electric motors 24a which are mounted on a projection 25a of the supporting means 25.

When the actuating means 24a, 24 are operated independently of each other, the respective flexible compressible container means 23a, 23b, or 23c is compressed, so that an operating fluid contained in the same and in the bellows means 66 is displaced and effects movement of the respective mounting means 59 with a respective roller die 12, 13 or 14 to the inner operative position. FIG. 13 shows the compressible container means 23c communicating with the bellows means 66 which operate a roller die 14 to move to the operative position, and it will be understood that container means 23a and 23b communicates in a corresponding manner with bellows means 66 operating the roller dies 13 and 12.

The inner roller dies 12a, 13a and 14a are operated in a corresponding manner. As shown in FIGS. 13 and 14, the bellows means 66a communicate through conduit means 67a with a compressible flexible container means 26a, while corresponding container means 26b and 26c are provided for the bellows means which cooperate with the other inner roller dies 12a and 13a. Annular presser members 68 of T-shaped cross section are again provided, and have portions abutting the compressible container means 26a, 26b, 26c, and other annular portions engaging the actuating members 27a. Actuating members 27a are longitudinally shiftable in axial direction on corresponding portions of the inner holding means 21, and are connected at the free ends thereof with three sleeves 41, 42 and 43 which rotate together with inner holding means 21. Fork-shaped end portions of actuating levers 28b terminate in slide members sliding in peripheral grooves of sleeves 41, 42 and 43 during rotation of the inner holding means 21 with the inner carrier means 22.

The ends of levers 28b have gear segments meshing with gears driven by motors 28a which are supported on stationary supporting means. The actuating means 28 including the motors 28a, and the levers 28b, the sleeves 41 to 43, and the actuating members 27a can be selectively operated for moving the respective inner roller dies 12a, 13a or 14a to the operative position. It will be understood that corresponding pairs of motors 24a and 28a are electrically connected to simultaneously actuate the hydraulic operating means by which the outer and inner roller dies of each set of pairs of outer and inner roller dies are operated.

Rods 65 pass through the webs of the presser member 61 to prevent rotation of the presser members during rotation of the carrier means. The actuating members 27a rotate at the same speed as the presser members 68. FIG. 22 shows the sealing means of the hydraulic motor means 66a in greater detail. A tubular part 80 connects the interior of the hydraulic bellows means 66a with the conduits 67 in the inner carrier means 22.

FIGS. 17 and 18 illustrate another modification according to which the flexible compressible container means 23' are interrupted so that springs 79 can be provided in the annular chambers for urging the presser means 61 away from the compressible container means 23'.

In the modified arrangement shown in FIG. 19, the collapsible container means 23d communicates with the bellows means 66 through flexible conduits 80 located in the conduits 67 of the carrier means 20. In this manner, leakage is reliably prevented. Removable pieces 91 are provided permitting the assembly of the flexible conduits in the ducts of the carrier means 20.

FIGS. 14 and 23 illustrate means for locking the mounting means of the roller dies in the advanced operative positions. When for some reason the hydraulic pressure in the bellows 66, 66a drops, the roller dies would be returned to the inoperative retracted position by the springs 59b and 59c. Locking means 70, 70a are provided which are urged by auxiliary bellows 69, 69a to move to a locking position engaging a shoulder of the respective mounting means 59, 59a when the roller dies are in the operative position, and to lock the mounting means in this position. The auxiliary hydraulic means 69 and 69a communicate with the containers 23a, 23b, 23c, and with the containers 26a, 26b, 26c, respectively. Spring means 70b and 70c return the locking means to a releasing position when the pressure in the auxiliary bellows 69 drops when the actuating means are controlled to effect retraction of the roller dies to the inoperative position. Parts 72 and 73 are inserted into carrier means 20 and 22 after assembly of the auxiliary bellows means 69 and 69a. Ducts 71 are provided to connect the auxiliary bellows 69 and 69a with axially extending ducts leading to ducts 67 and 67a which communicate with a flexible annular container means controlled by the actuating means.

While hydraulic operating means are illustrated in FIGS. 1, 2, 13 and 14, it is also possible to provide mechanical operating means for the roller dies 12, 13 and 14. As shown in FIG. 15, a pair of outer and inner roller dies 12 is mounted on mounting means 59 and 59a which are shiftable in axial direction in carrier means 20 and 22. Operating members 77 are secured to the mounting means, and are slidably engaged by cam means 76 and 76a which are mounted for axial movement in the carrier means 20 and 22. When the cam means 76 and 76a are shifted to the left as viewed in FIG. 15, the roller dies 12 will be moved to an operative closely spaced position. Other pairs of outer and inner rollers are operated by cam means 75, 75a. Rings 74 are secured to the cam means 75 and 76, and the actuating member 24a, described with reference to FIG. 13 have rollers 64 rolling on rings 74 during rotation of carrier means 20 relative to the stationary supporting means on which the actuating means 24 are mounted. The end portions of cams 76a and 75a are connected to actuating members 27a by pivotal connections, actuating members 27a being operated as described with reference to FIG. 1.

Referring again to FIG. 1, the carrier means 20 is illustrated in a position in which it is not yet inserted into the outer holding means 29. The inner carrier means 22 is also shown located outside of the outer carrier means 20, and spaced from the supporting means 18, the outer holding means 19, and the inner holding means 21. The inner holding means 21 carries at one end a gear 36 meshing with a drive pinion 37 which is driven from a motor, not shown. A bearing means 38 rotatably supports the inner holding means 21. The outer holding means 19 has about the periphery thereof a gear crown meshing with a gear 34 connected by a shaft 34a to a gear 40 meshing with a gear train 39 one gear of which is secured to the inner holding means 21 for rotation so that the outer holding means 19 and the inner holding means 21 are rotated at the same rotary speed and in the same direction.

The outer carrier means 21 is shown in FIG. 1 supported on supporting means 31 and 44. As shown in FIG. 11, transporting rollers 58' are provided on the support 31, and corresponding transporting rollers are provided on support 44, so that the outer carrier means is guided for axial movement from the position illustrated in FIG. 1 to a position located within the outer holding means 19. Roller means 58 are driven to transport the carrier means 20 to this position. The carrier means 20 is first placed on the supporting table 45, and then raised by jacks 46 to a position in which it can be axially shifted to a position located within the supports 31 and 44. Supporting table 45 may also be used to elevate short workpieces.

The inner carrier means 22 is shown in FIG. 1 to be mounted on a mandrel 47 and engaged by an inner conical surface of a transporting member 48 which has an outer conical surface fitting into a corresponding conical recess in the outer carrier means 20 so that transporting member 48 can be used for transporting outer carrier means 20 and inner carrier means 22 in axial direction. On the conical surfaces of transporting member 48, axially extending ribs are provided which fit into corresponding grooves in the matching conical coupling faces of the carriers means 20 and 22, so that the angular position of carrier means 20 and 22 is exactly determined when the same are transported by the transporting member 48. The angular position of the outer carrier means relative to the outer holding means 19, and the angular position of the inner carrier means 22 relative to the inner holding means 21 is important, since radially movable coupling members are provided for coupling the outer carrier means with the outer holding means, and for coupling the inner carrier means with the inner holding means, as will be described hereinafter.

The transporting member 48 is axially shiftable on the mandrel 47 which is fixedly connected to a carriage means 50. Carriage means 50 is guided on guide means provided on the three supports 51, and is moved in axial direction together with mandrel 47 by spindle 52 passing through nut means secured to carriage 50.

The transporting member 48 is moved on the mandrel 47 by hydraulic motor means 53 mounted on the carriage means 50. Consequently, the carrier means 22 can be placed on mandrel 47, and then coupled to the transporting member 48.

Mandrel 47 has at its free end a conical portion 54 matching a corresponding conical recess 55 in the inner holding means 21.

The mandrel 47 is shifted by carriage 50 until the part 54 is located in the recess 55, whereupon the transporting member 48 is operated to push the inner carrier means 22 onto the inner holding means. The transporting member 48 is used in a corresponding manner to push the outer carrier means 20 into the outer holding means 19. Consequently it is not absolutely necessary to drive the transporting rollers 58' in the supports 44 and 31. When the outer and inner carriers are properly positioned, the carriage 50 is withdrawn with transporting member 48. Since only the outer holding means 19 and the inner holding means 21 are driven, it is now necessary to couple the carrier means with the holding means to obtain a synchronous rotation of the outer and inner carrier means with the outer and inner roller dies.

As shown in FIGS. 1 and 2, a coupling lever 29 is turnably mounted on the support 31, and is turned to the position shown in FIG. 1 during the positioning of the outer carrier means 20. When the same is in place in the outer holding means 19, the coupling lever 30 is turned to the position shown in FIG. 2 and FIG. 24. As best seen in FIG. 24, coupling lever 29 has a roller 29a rolling on an annular presser member 29b which acts on a compressible container means 29c communicating with a flexible and expansible bellows by which a coupling piston 93 is operated. The shaft 29' of actuating lever 29 can be moved in axial direction by a pinion acting on a rack portion 30 of shaft 29' and being driven by a motor 30a. The outer holding means 19 has recesses into which the coupling pistons 93 are pushed when the actuating means 30, 29 displace the operating fluid from container 29c into the hydraulic motor 29d. Several coupling pistons 93 are provided about the circumference of the outer carrier means 20.

Locking means are provided for locking the coupling pistons 93 in the operative coupling position. As shown in FIGS. 24 and 25, a bifurcated member 94 can be advanced to a position engaging opposite sides of an annular groove 95 in coupling piston 93, and corresponding grooves in holding means 19, so that coupling piston 93 is locked in the operative coupling position. Displacement of the locking means 94 is prevented by a transverse projection on a turnable member 96. When the coupling is to be released, member 96 is turned, and locking means 94 retracted.

FIG. 20 shows a coupling piston 93" provided with a flange engaged by springs 92 which urge the coupling piston to move to an inoperative position.

Coupling means 33 for coupling the inner carrier means 22 with the inner holding means 21 are shown in FIGS. 2 and 26. The expansible hydraulic members 33a communicate with bellows 33b which are compressed by presser members 33c when the coupling pistons 93' are to be moved outwardly to coupling positions located in corresponding recesses in the inner carrier means 22. Bifurcated locking means 94' are provided for locking the locking pistons 93' in the operative coupling positions, and are held in place by turnable members 96. Presser member 33c is shifted by a rack bar and motor arrangement as described with reference to the outer coupling means 29.

When the carrier means are coupled to the holding means, the carriage 50 and transporting member 48 are withdrawn from the supporting means 51, and the supporting means 31 and 44 are also free. Consequently, the tubular workpiece 10 can now be introduced through the central openings in the supporting means 51, 44 and 31. The workpiece is guided by guide rollers 58 in supporting means 51, as best seen in FIG. 10, and by guide rollers 58' in supporting means 31, and 58'' in supporting means 25. Each supporting means 31, 44, 51 has a radial guide means 57 on opposite sides of recesses 56 in which slide means 97 are guided for radial movement, as best seen in FIGS. 27 and 28. The guide rollers 58 have axes of rotation transverse to the common axis of the carrier means and of the workpiece, and roll in axial direction on the workpiece when the same is transported by the roller dies. At the same time, the guide rollers 58 prevent a turning movement of the workpiece 10. It will be understood that the roller dies exert a turning moment on the workpiece 10, while moving along a helical line on the same. If the workpiece could be turned by this moment, it would not be transported in axial direction, which is necessary for the operation in accordance with the invention.

In order to prevent the turning movement of the workpiece 10, the rollers 58 are constructed in such a manner that a slight angular displacement of the workpiece 10 will cause a tilting of guide rollers 58, and guide rollers 58 are constructed in such a manner that they block turning movement of the workpiece in tilted positions.

Slide 97 has bearings 98 in which shaft 99 is mounted. Shaft 99 carries a hollow shaft or sleeve 100 which is connected to shaft 99 for rotation therewith. Sleeve 100 has a spherical surface 101 on which an inner spherical bearing face of a guide roller 58 is mounted so that tilting of guide roller 58 about an axis parallel to the axis of the workpiece is possible. Sleeve 100 is composed of two parts having flanges 102 and 102a connected by bolt and nut means 103. The lateral surfaces of each guide roller 58 are formed with substantially frusto-conical recesses for receiving the confronting frusto-conical inner surfaces of the flanges 102 and 102a in the tilted positions of guide rollers 58. Bolts 103 pass through holes 104 in guide rollers 58.

The spherical journal surface 101 and the corresponding spherical bearing surface of guide roller 58 are curved along a circle having its center in the axis of shaft 99, and a radius R1. Each hole 104 has a supporting face extending along a circular line having a center in the axis of shaft 99, and a radius of curvature R2. Consequently, each guide roller 58 can turn on the spherical journal surface 101 to a tilted position when the workpiece 10 is angularly displaced a small angle. Such tilting movement is limited by the flanges 102 and 102a. The peripheral outer rim surface of guide roller 58 is curved and has a radius of curvature R3 which is greater than the radial distance between the rim surface and the axis of shaft 99. Consequently, the annular edges of the peripheral rim surface will be farther spaced from the axis of shaft 99 in the tilted positions of guide roller 58, than the central annular line of the peripheral rim surface of guide roller 58 in the central position illustrated in FIGS. 28 and 29.

Consequently, an angular displacement of the workpiece 10 is only possible until the guide rollers 58 are tilted a small angle in which the curvature of the peripheral rim surface becomes effective to exert pressure on the workpiece in a cam-like action which prevents further turning of the workpiece.

The rolling mill is operated as follows: The outer carrier means 20 is placed on the supporting table 45 and raised until transporting member 48 can engage the corresponding frusto-conical recess at the end of the outer carrier means 20. Transporting member 48 is axially shifted to place carrier means 20 within support 44 so that the corresponding rollers 58 engage the outer surface of the carrier means 20. As shown in FIG. 10, motors 105 are provided for rotating guide rollers 58 during this operation, so that carrier means 20 is moved into the outer holding means 19, and when carrier means 20 is accurately centered in holding means 19, the coupling means described with reference to FIGS. 24 and 25 are actuated so that the outer carrier means is coupled to the outer holding means 19 for rotation. The coupling pistons may be normally retracted by springs 92 acting on flanges thereon, as shown in FIG. 20. When container means 29c is compressed upon operation of the actuating means 30, the coupling pistons 93 are advanced to the coupling position. During the rotation of the outer holding means with the outer carrier means during a rolling operation, the rollers 29a roll on the annular rims of the presser members 29b.

Thereupon the inner carrier means 22 is raised by table 45 until the supporting mandrel 47 can be placed within the inner carrier means 22 by movement of carriage 50. Transporting member 48 is operated, and its frusto-conical surface engages the corresponding frusto-conical surface of the inner carrier means 22. The carriage 50 is moved until the pointed end 54 of mandrel 47 passes into the recess 55 of the inner holding mandrel 21, whereupon transporting member 48 is axially shifted to move the inner carrier means 22 onto the inner holding means 21, whereupon the inner coupling means shown in FIG. 26 are operated until the coupling pistons 93' couple the inner holding means 21 to the inner carrier means 22. Thereupon, transporting member 48 and mandrel 47 are retracted by carriage 50.

The carriage 50 is fully retracted, and a workpiece 10 is placed within supports 51 and transported by guide rollers corresponding to guide rollers 58 to a position located within support 44 and 31 where the guide rollers 58 engage the workpiece. At least some of the guide rollers are driven by motors 105 so that the workpiece can be moved into the annular gap between the outer and inner carrier means where it is engaged by the roller dies 11. When the motor driving pinion 37 is started, the outer holding means 19 and the inner holding means 21 are rotated, so that the outer and inner carrier means are rotated in synchronism. The set of pairs of roller dies 11, 11a engages the workpiece, and moves about the circumference of the same. Since the axes of roller guides 11, 11a are inclined to the common axis of rotation of the carrier means 20 and 22, the workpiece 10 is forced to move in axial direction since its rotation is prevented by the guide rollers 58 as explained with reference to FIGS. 27 to 29. Due to the forced axial movement of the workpiece, the roller dies 11, 11a move along a helical line on the workpiece corresponding to a nut having a right-handed thread. This position is shown in FIG. 3, and after the workpiece has been moved a desired distance in axial direction, the motor 24a is started which controls the presser member 61 acting on the container means 23 which effects shifting of the roller dies 12, 12a to an operative position engaging the workpiece. While the carrier means and the holding means continue to rotate in the same sense of rotation, the workpiece moves now in the opposite axial direction due to the different inclination of the roller dies 12, 12a which have the effect of a nut having left-handed threads. The wall thickness of the tubular workpiece 10 is reduced, as indicated at 10b in FIG. 3, so that the thinner workpiece can move between roller dies 11, 11a without engaging the same. After traveling of the workpiece a predetermined distance to the left as viewed in FIG. 2, the motor 24a is started which advances the roller dies 13, 13a to the operative position engaging the workpiece. Roller dies 13, 13a have axes parallel to the axes of roller dies 11, 11a, or slightly inclined to the same, but in any event the axes of roller dies 13, 13a are positioned in such a manner that roller dies 13, 13a have the effect of a nut having right-handed thread forcing the workpiece to the right as viewed in FIG. 3 while its wall thickness is reduced to such an extent that the workpiece can pass between roller dies 12, 12a without engaging the same.

Finally, the roller dies 14, 14a are advanced to the operative position, and cause travel of the workpiece to the left as viewed in FIG. 3 since they have the effect of a nut having a left-handed thread. The peripheral surfaces of roller dies 14, 14a are shaped in such a manner as to have a smoothing and finishing effect on the workpiece.

It will be understood that each of the elements described above, or two or more together, may also find a useful application in other types of rolling mills differing from the types described above.

While the invention has been illustrated and described as embodied in a rolling mill for tubular workpieces having roller dies for effecting successive axial movements of the tubular workpiece in opposite directions, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a rolling mill for tubular workpieces, in combination, stationary supporting means; an outer carrier means, and an inner carrier means located within said outer carrier means, said inner and outer carrier means being supported on said supporting means for rotation about a common axis and defining between each other an annular path for a tubular workpiece; guide means for non-rotatably guiding the workpiece along said path in the direction of said axis of said carrier means; drive means for rotating said outer and inner carrier means in one direction; at least one set of angularly spaced pairs of outer and inner first dies mounted on said outer and inner carrier means, respectively, in a position projecting into said annular path; at least one set of angularly spaced pairs of outer and inner second dies mounted on said outer and inner carrier means, respectively, axially spaced from said set of first dies, and for movement between an inoperative position retracted from said path and an operative position projecting into said path, said first dies being inclined in one direction and said second dies being inclined in the opposite direction to said axis of said carrier means; and operating means mounted on said outer and inner carrier means, respectively, for holding said second dies in said inoperative position while said workpiece is engaged along a helical line and transported in one axial direction by said first dies during rotation of said carrier means, and for moving said second dies to said operative position after treatment of said workpiece by said first dies has been completed whereby the workpiece is moved by said second dies in the opposite axial direction during rotation of said carrier means in the same sense of rotation due to the opposite inclination of said first and second dies to said axis of said carrier means.

2. In a rolling mill for tubular workpieces, in combination, stationary supporting means; an outer carrier means, and an inner carrier means located within said outer carrier means, said inner and outer carrier means being supported on said supporting means for rotation about a common axis and defining between each other an annular path for a tubular workpiece; guide means for non-rotatably guiding the workpiece along said path in the direction of said axis of said carrier means; drive means for rotating said outer and inner carrier means in one direction; at least one set of angularly spaced pairs of outer and inner first roller dies mounted on said outer and inner carrier means, respectively, for rotation about roller axes, and in a position projecting into said annular path; at least one set of angularly spaced pairs of outer and inner second roller dies mounted on said outer and inner carrier means, respectively, for rotation about roller axes, and axially spaced from said set of first dies, and for movement between an inoperative position retracted from said path and an operative position projecting into said path, said roller axes of said first dies being inclined in one direction and said roller axes of said second dies being inclined in the opposite direction to said axis of said carrier means; and operating means mounted on said outer and inner carrier means, respectively, for holding said second dies in said inoperative position while said workpiece is engaged along a helical line and transported in one axial direction by said first dies during rotation of said carrier means, and for moving said second dies to said operative position after treatment of said workpiece by said first dies has been completed whereby the workpiece is moved by said second dies in the opposite axial direction during rotation of said carrier means in the same sense of rotation due to the opposite inclination of said first and second dies to said axis of said carrier means.

3. A rolling mill as set forth in claim 2 wherein said inner and outer second dies are closer spaced from each other in said operative position than said outer and inner first dies so that the workpiece is not engaged by said first dies while the workpiece is moved in said opposite axial direction by said second dies.

4. A rolling mill as set forth in claim 3 and including another set of outer and inner first dies mounted on said outer and inner carrier means respectively axially spaced from said set of first dies and movable between an inoperative position retracted from said path and an operative position projecting into said path farther than said second dies in said operative position of the same; and another set of outer and inner second dies mounted on said outer and inner carrier means, respectively, axially spaced from said set of second dies and movable between an inoperative position retracted from said path and operative position projecting into said path farther than said first dies of said other set of first dies in said operative position of the same.

5. In a rolling mill for tubular workpieces, in combination, stationary supporting means; an outer carrier means, and an inner carrier means located within said outer carrier means, said inner and outer carrier means being supported on said supporting means for rotation about a common axis and defining between each other an annular path for a tubular workpiece; guide means for non-rotatably guiding the workpiece along said path in the direction of said axis of said carrier means; drive means for rotating said outer and inner carrier means in one direction; at least one set of angularly spaced pairs of outer and inner first dies mounted on said outer and inner carrier means, respectively, in a position projecting into said annular path; at least one set of angularly spaced pairs of outer and inner second dies mounted on said outer and inner carrier means, respectively, axially spaced from said set of first dies, and for movement between an inoperative position retracted from said path and an operative position projecting into said path, said first dies being inclined in one direction and said second dies being inclined in the opposite direction to said axis of said carrier means; operating means mounted on said outer and inner carrier means, respectively, for holding said second dies in said inoperative position while said workpiece is engaged along a helical line and transported in one axial direction by said first dies during rotation of said carrier means, and for moving said second dies to said operative position after treatment of said workpiece by said first dies has been completed whereby the workpiece is moved by said second dies in the opposite axial direction during rotation of said carrier means in the same sense of rotation due to the opposite inclination of said first and second dies to said axis of said carrier means; and actuating means mounted on said supporting means and being operatively connected to said operating means for actuating the same during rotation of said carrier means.

6. In a rolling mill for tubular workpieces, in combination, stationary supporting means; an outer carrier means, and an inner carrier means located within said outer carrier means, said inner and outer carrier means being supported on said supporting means for rotation about a common axis and defining between each other an annular path for a tubular workpiece; guide means for non-rotatably guiding the workpiece along said path in the direction of said axis of said carrier means; drive means for rotating said outer and inner carrier means in one direction; at least one set of angularly spaced pairs of outer and inner first roller dies mounted on said outer and inner carrier means, respectively, for rotation about roller axes, and in a position projecting into said annular path; at least one set of angularly spaced pairs of outer and inner second roller dies mounted on said outer and inner carrier means, respectively, for rotation about roller axes, and axially spaced from said set of first dies, and for movement between an inoperative position retracted from said path and an operative position projecting into said path, said roller axes of said first dies being inclined in one direction and said roller axes of said second dies being inclined in the opposite direction to said axis of said carrier means; operating means mounted on said outer and inner carrier means, respectively, for holding said second dies in said inoperative position while said workpiece is engaged along a helical line and transported in one axial direction by said first dies during rotation of said carrier means, and for moving said second dies to said operative position after treatment of said workpiece by said first dies has been completed whereby the workpiece is moved by said second dies in the opposite axial direction during rotation of said carrier means in the same sense of rotation due to the opposite inclination of said first and second dies to said axis of said carrier means, said operating means including hydraulic motor means in said outer and inner carrier means, compressible container means in said outer and inner carrier means communicating with said hydraulic motor means so that upon compression of said container means said outer and inner second dies are moved to said operative position, and presser means mounted on said outer and inner carrier means and engaging said compressible container means; and actuating means mounted on said supporting means and including connecting means connecting said presser means with said actuating means during rotation of said presser means with said outer and inner carrier means relative to said actuating means whereby said second dies can be moved to said operative position during rotation of said carrier means relative to said supporting means.

7. In a rolling mill for tubular workpieces, in combination, stationary supporting means; an outer carrier means, and an inner carrier means located within said outer carrier means, said inner and outer carrier means being supported on said supporting means for rotation about a common axis and defining between each other an annular path for a tubular workpiece; guide means for non-rotatably guiding the workpiece along said path in the direction of said axis of said carrier means; drive means for rotating said outer and inner carrier means in one direction; at least one set of angularly spaced pairs of outer and inner first roller dies; first mounting means for mounting said first roller dies on said outer and inner carrier means, respectively, for rotation about first roller axis and in a position projecting into said annular path; at least one set of angularly spaced pairs of outer and inner second roller dies; second mounting means for mounting said second roller dies on said outer and inner carrier means, respectively, for rotation about said second roller axes, axially spaced from said set of first dies, said second mounting means being movable for moving said second roller dies between an inoperative position retracted from said path and an operative position projecting into said path, said first roller axes being parallel and inclined in one direction, and said second roller axes being parallel and inclined in the opposite direction to said axis of said carrier means; and operating means for holding said second roller dies in said inoperative position while said workpiece is engaged along a helical line and transported in one axial direction by said first roller dies during rotation of said carrier means, and for moving said second roller dies to said operative position after treatment of said workpiece by said first roller dies has been completed whereby the workpiece is moved by said second roller dies in the opposite axial direction during rotation of said carrier means in the same sense of rotation due to the opposite inclination of said first and second roller axes to said axis of said carrier means, said operating means including flexible expansible bellow means in said outer and inner carrier means abutting said second mounting means, compressible annular container means in said outer and inner carrier communicating with said bellow means, an operating fluid in said bellow means and container means so that upon compression of said container means said outer and inner second dies are moved to said operative position, and annular presser members mounted on said outer and inner carrier means, respectively, and having portions engaging said container means, and annular portions projecting from said outer and inner carrier means; actuating means mounted on said stationary supporting means and being movable toward and away from said annular portions, said actuating means including roller means rolling on said annular portions during rotation of said carrier means for connecting said presser means with said actuating means during rotation of said presser means.

8. A rolling mill as set forth in claim 7 and including spring means abutting said second mounting means for urging said second roller dies into said inoperative position; locking means for locking said second mounting means when said second roller dies are in said operative position; and hydraulic means including flexible containers, and an operating fluid in said flexible containers for operating said locking means.

9. A rolling mill as set forth in claim 7 and including another set of outer and inner first roller dies mounted on said outer and inner carrier means, respectively, axially spaced from said set of first roller dies; third mounting means turnably supporting said last mentioned first roller dies for turning movement about first roller axes and being movable for moving the respective roller dies between an inoperative position retracted from said path and an operative position projecting into said path farther than said second dies in said operative position of the same; another set of outer and inner second roller dies; fourth mounting means on said outer and inner carrier means, respectively, supporting said last mentioned second roller dies for turning movement about second roller axes and being movable for moving the respective roller dies between an inoperative position and an operative position projecting into said path farther than the first roller dies of said other set; said operating means including other bellow means, other annular container means, and other annular presser members for operating said third and fourth mounting means; and including other actuating means co-operating with said other presser members.

10. In a rolling mill for tubular workpieces, in combination, stationary supporting means; an outer carrier means, and an inner carrier means located within said outer carrier means, said inner and outer carrier means being supported on said supporting means for rotation about a common axis and defining between each other an annular path for a tubular workpiece; guide means for non-rotatably guiding the workpiece along said path in the direction of said axis of said carrier means; drive means for rotating said outer and inner carrier means in one direction; at least one set of angularly spaced pairs of outer and inner first roller dies; first mounting means for mounting said first roller dies on said outer and inner carrier means, respectively, for rotation about first roller axis and in a position projecting into said annular path; at least one set of angularly spaced pairs of outer and inner second roller dies; second mounting means for mounting said second roller dies on said outer and inner carrier means, respectively, for rotation about said second roller axes, axially spaced from said set of first dies, said second mounting means being movable for moving said second roller dies between an inoperative position retracted from said path and an operative position projecting into said path, said first roller axes being parallel and inclined in one direction, and said second roller axes being parallel and inclined in the opposite direction to said axis of said carrier means; and operating means for holding said second roller dies in said inoperative position while said workpiece is engaged along a helical line and transported in one axial direction by said first roller dies during rotation of said carrier means, and for moving second roller dies to said operative position after treatment of said workpiece by said first roller dies has been completed whereby the workpiece is moved by said second roller dies in the opposite axial direction during rotation of said carrier means in the same sense of rotation due to the opposite inclination of said first and second roller axes to said axis of said carrier means, said operating means including outer and inner operating members connected to said first and second mounting means respectively, cam means in said outer and inner carrier means engaging said operating members, respectively, and being mounted for movement in axial direction for effecting movement of said second roller dies to said operative position; and actuating means movably mounted on said supporting means and including connecting means connecting said actuating means with said cam means during rotation of said outer and inner carrier means relative to said actuating means.

11. A rolling mill as set forth in claim 10 wherein said connecting means include roller means, and annular members secured to said cam means and being engaged by said roller means so that said roller means roll on said annular members during rotation of said carrier means.

12. In a rolling mill for tubular workpieces, in combination, stationary supporting means; an outer annular holding means and an inner holding means mounted on said supporting means for rotation about a common axis; an outer carrier means and an inner carrier means located within said outer carrier means; outer and inner coupling means for securing said outer carrier means in said annular outer holding means, and for securing said inner carrier means on said inner holding means for rotation with the same about said common axis, said outer and inner carrier means defining between each other an annular path for a tubular workpiece; guide means for non-rotatably guiding said workpiece along said path in the direction of said axis of said carrier means and holding means; drive means for rotating said outer and inner holding means and thereby said outer and inner carrier means in one direction; at least one set of angularly spaced pairs of outer and inner first roller dies mounted on said outer and inner carrier means, respectively, for rotation about roller axes, and in a position projecting into said annular path; at least one set of angularly spaced pairs of outer and inner second roller dies mounted on said outer and inner carrier means, respectively, for rotation about roller axes, and axially spaced from said set of first dies, and for movement between an inoperative position retracted from said path and an operative position projecting into said path, said roller axes of said first dies being inclined in one direction and said roller axes of said second dies being inclined in the opposite direction to said axis of said carrier means; and operating means mounted on said outer and inner carrier means, respectively, for holding said second dies in said inoperative position while said workpiece is engaged along a helical line and transported in one axial direction by said first dies during rotation of said carrier means, and for moving said second dies to said operative position after treatment of said workpiece by said first dies has been completed whereby the workpiece is moved by said second dies in the opposite axial direction during rotation of said carrier means in the same sense of rotation due to the opposite inclination of said first and second dies to said axis of said carrier means.

13. In a rolling mill for tubular workpieces, in combination, stationary supporting means; an outer annular holding means and an inner holding means mounted on said supporting means for rotation about a common axis; an outer carrier means and an inner carrier means located within said outer carrier means; outer and inner coupling means for securing said outer carrier means in said annular outer holding means, and for securing said inner carrier means on said inner holding means for rotation with the same about said common axis, said outer and inner carrier means defining between each other an annular path for a tubular workpiece; guide means for non-rotatably guiding said workpiece along said path in the direction of said axis of said carrier means and holding means; drive means for rotating said outer and inner holding means and thereby said outer and inner carrier means in one direction; at least one set of angularly spaced pairs of outer and inner first roller dies; first mounting means for mounting said first roller dies on said outer and inner carrier means, respectively, for rotation about first roller axis and in a position projecting into said annular path; at least one set of angularly spaced pairs of outer and inner second roller dies; second mounting means for mounting said second roller dies on said outer and inner carrier means, respectively, for rotation about said second roller axes, axially spaced from said set of first dies, said second mounting means being movable for moving said second roller dies between an inoperative position retracted from said path and an operative position projecting into said path, said first roller axes being parallel and inclined in one direction, and said second roller axes being parallel and inclined in the opposite direction to said axis of said carrier means; and operating means for holding said second roller dies in said inoperative position while said workpiece is engaged along a helical line and transported in one axial direction by said first roller dies during rotation of said carrier means, and for moving said second roller dies to said operative position after treatment of said workpiece by said first roller dies has been completed whereby the workpiece is moved by said second roller dies in the opposite axial direction during rotation of said carrier means in the same sense of rotation due to the opposite inclination of said first and second roller axes to said axis of said carrier means, said operating means including flexible expansible bellow means in said outer and inner carrier means abutting said second mounting means, compressible annular container means in said outer and inner carrier communicating with said bellow means, an operating fluid in said bellow means and container means so that upon compression of said container means said outer and inner second dies are moved to said operative position, and annular presser members mounted on said outer and inner carrier means, respectively, and having portions engaging said container means, and annular portions projecting from said outer and inner carrier means; actuating means mounted on said stationary supporting means and being movable toward and away from said annular portions, said actuating means including roller means rolling on said annular portions during rotation of said carrier means for connecting said presser means with said actuating means during rotation of said presser means.

14. A rolling mill as set forth in claim 13 including hydraulic motor means for operating said outer and inner coupling means in said outer and inner carrier means; annular compressible container means in said outer and inner carrier means communicating with said last-mentioned hydraulic motor means; annular presser members abutting said last-mentioned compressible container means; and actuating means on said supporting means including roller means in rolling engagement with said last mentioned annular presser members.

15. In a rolling mill for tubular workpieces, in combination, stationary supporting means; an outer carrier means, and an inner carrier means located within said outer carrier means, said inner and outer carrier means being supported on said supporting means for rotation about a common axis and defining between each other an annular path for a tubular workpiece; guide means for non-rotatably guiding the workpiece along said path in the direction of said axis of said carrier and including an annular guide body surrounding the workpiece, a plurality of guide rollers angularly spaced from each other and having axes transverse to said common axis, the peripheral rims of said rollers rolling in axial direction on the workpiece, each of said guide rollers being mounted on said guide body angularly displaceable about a tilting axis parallel to said common axis, and said peripheral rim having such a shape that the workpiece is clamped between said guide rollers so as to be prevented from turning movement while moving in axial direction when said guide rollers are tilted by a slight angular displacement of the workpiece about said tilting axes out of a radial plane passing through said common axis; drive means for rotating said outer and inner carrier means in one direction; at least one set of angularly spaced pairs of outer and inner first roller dies mounted on said outer and inner carrier means, respectively, for rotation about roller axes, and in a position projecting into said annular path; at least one set of angularly spaced pairs of outer and inner second roller dies mounted on said outer and inner carrier means, respectively, for rotation about roller axes, and axially spaced from said set of first dies, and for movement between an inoperative position retracted from said path and an operative position projecting into said path, said roller axes of said first dies being inclined in one direction and said roller axes of said second dies being inclined in the opposite direction to said axis of said carrier means; and operating means mounted on said outer and inner carrier means, respectively, for holding said second dies in said inoperative position while said workpiece is engaged along a helical line and transported in one axial direction by said first dies during rotation of said carrier means, and for moving said second dies to said operative position after treatment of said workpiece by said first dies has been completed whereby the workpiece is moved by said second dies in the opposite axial direction during rotation of said carrier means in the same sense of rotation due to the opposite inclination of said first and second dies to said axis of said carrier means.

16. A rolling mill as set forth in claim 15 wherein each of said guide rollers has a peripheral rim curved along a radius of curvature greater than the distance between said transverse axis and said peripheral rim.

17. A rolling mill as set forth in claim 16 wherein each of said guide rollers has an inner spherical bearing face; and including a shaft for each guide roller having a spherical journal portion on which said spherical bearing face is mounted.

18. A rolling mill as set forth in claim 17 and including a plurality of slides mounted for movement in radial direction on said guide body, each slide supporting said shaft of one of said guide rollers; and means for moving said slides in radial direction.

19. In a rolling mill for tubular workpieces, in combination, stationary supporting means; an outer annular holding means and an inner holding means mounted on said supporting means for rotation about a common axis; an outer carrier means and an inner carrier means located within said outer carrier means; outer and inner coupling means for securing said outer carrier means in said annular outer holding means, and for securing said inner carrier means on said inner holding means for rotation with the same about said common axis, said outer and inner carrier means defining between each other an annular path for a tubular workpiece; guide means for non-rotatably guiding the workpiece along said path in the direction of said axis of said carrier and including an annular guide body surrounding the workpiece, a plurality of guide rollers angularly spaced from each other and having axes transverse to said common axis, the peripheral rims of said rollers rolling in axial direction on the workpiece, each of said guide rollers being mounted on said guide body angularly displaceable about a tilting axis parallel to said common axis, and said peripheral rim having such a shape that the workpiece is clamped between said guide rollers so as to be prevented from turning movement while moving in axial direction when said guide rollers are tilted by a slight angular displacement of the workpiece about said tilting axes out of a radial plane passing through said common axis; drive means for rotating said outer and inner holding means and thereby said outer and inner carrier means in one direction; at least one set of angularly spaced pairs of outer and inner first roller dies mounted on said outer and inner carrier means, respectively, for rotation about roller axes, and in a position projecting into said annular path; at least one set of angularly spaced pairs of outer and inner second roller dies mounted on said outer and inner carrier means, respectively, for rotation about roller axes, and axially spaced from said set of said first dies, and for movement between an inoperative position retracted from said path and an operative position projecting into said path, said roller axes of said first dies being inclined in one direction and said roller axes of said second dies being inclined in the opposite direction to said axis of said carrier means; and operating means mounted on said outer and inner carrier means, respectively, for holding said second dies in said inoperative position while said workpiece is engaged along a helical line and transported in one axial direction by said first dies during rotation of said carrier means, and for moving said second dies to said operative position after treatment of said workpiece by said first dies has been completed whereby the workpiece is moved by said second dies in the opposite axial direction during rotation of said carrier means in the same sense of rotation due to the opposite inclination of said first and second dies to said axis of said carrier means.

20. A rolling mill as set forth in claim 19 wherein said inner holding means is a mandrel having a recess at one end; and including apparatus for moving said outer carrier means into and out of said outer holding means and for moving said inner carrier onto said mandrel, said apparatus comprising a carriage mounted on said supporting means for movement in the direction of said common axis and including a supporting mandrel having a pointed end fitting into said recess of said first mentioned mandrel, a transporting member having two frusto-conical supporting surfaces for respectively engaging corresponding surfaces of said outer and inner carrier means, and means for moving said transporting member in axial direction relative to said supporting mandrel so that said inner carrier means is shifted from said supporting mandrel onto said first mentioned mandrel; said guide rollers of said guide means being in rolling engagement with said outer carrier means and while the same is transported by said transporting means; and motor means for driving said guide rollers so that said outer carrier means is shifted into said outer holding means.

References Cited in the file of this patent

UNITED STATES PATENTS

| | | |
|---|---|---|
| 490,628 | Heckert | Jan. 24, 1893 |
| 633,136 | Hartz | Sept. 19, 1899 |
| 700,360 | McTeas | May 20, 1902 |
| 1,184,974 | Lloyd | May 30, 1916 |
| 1,665,915 | Ekman | Apr. 10, 1928 |